2,773,067

PREPARATION OF OXAZOLIDONES-2

Marcel Jean Viard, Bois Colombe, France, assignor to Societe Anonyme des Manufactures des Glaces et Produits Chimiques de Saint-Gobain, Chauny et Cirey, Paris, France No Drawing. Application February 24, 1953, Serial No. 338,614

Claims priority, application France February 25, 1952

16 Claims. (Cl. 260—307)

This invention relates to a process of preparing oxazolidones-2 which are represented by the general formula:

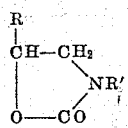

in which R and R' are hydrogen or a hydrocarbon radical. The hydrocarbon radicals may themselves be substituted provided that the substituents are not of such nature as would have entered into the reactions by which the product was made. Oxazolidones 2 are useful products, and the novel methods by which they are made, as hereinafter set forth, produce them in a high degree of purity at approximately a 90% yield. The process is consequently commercial and of great value. The novel process comprises reacting an alkali bicarbonate with an alkaline sulphate ester of the ethanolamines. The following meanings are adopted in this specification:

The alkaline sulphate esters of ethanolamine include within the word "alkaline" all the alkaline metals and ammonia. The ethanolamines may be monoethanolamines, diethanolamines, triethanolamines, and substituted ethanolamines which bear a hydrocarbon substituent, examples of which are given later.

The fundamental reaction of the invention is deemed, at present, to have two succesive phases, in the first of which an alkali bicarbonate is fixed on the amino group of the alkaline sulphate ester of ethanolamine, forming an alkaline salt of a substituted carbamic acid, the reaction being accompanied by the production of a molecule of water as in the following equation:

(1)

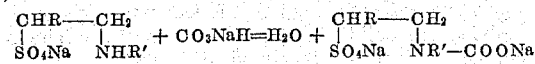

The second step of this reaction apparently involves the loss of a molecule of alkali sulphate and the cyclizing, ring formation, of the remainder of the molecule, producing the oxazolidone in accordance with the equation:

(2)

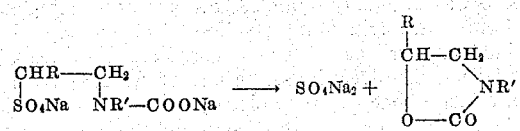

Reaction 2 proceeds better at higher temperature than reaction 1, and it is consequently important to conduct the part of the reaction mainly concerned with reaction 1 at a lower temperature before raising the temperature to that which is more favorable to reaction 2.

The alkaline sulphuric ester of ethanolamine chosen for use in the reaction may be obtained from any suitable source, for instance by preparation in the plant by any suitable means. Thus, the reaction may proceed by the introduction into a suitable reaction medium of the previously prepared reactants. However, it is particularly advantageous, in practice, to begin with compounds that are more readily available and which can be made, in some cases, to produce the desired reactants in situ, so that the formation of the oxazolidone may proceed directly without an initial isolation of the individual reactants.

The alkaline sulphate esters of ethanolamine may also be called alkaline salts of sulphuric esters of ethanolamines.

The preparation of the alkaline sulphuric esters of ethanolamines may be carried out by the neutralization of the sulphuric acid esters of ethanolamine by means of an alkali carbonate. The alkali carbonates are the carbonates of alkali metals and include two general classes, the so-called neutral carbonates in which each carbonate radical is attached to metal alone, and the acid or bicarbonates in which the carbonate radical is attached to a metal and a hydrogen atom. In the case where the alkali carbonate is employed the reaction proceeds as follows:

(3)

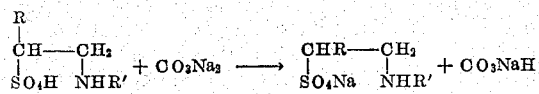

It will be observed that in this case the product of the reaction is composed of two ingredients, which are those which react to produce the oxazolidone. Consequently, the result of this reaction is to produce in situ the ingredients which can be made to produce the oxazolidone by a simple increase in temperature. The ingredients are employed in equi-molecular ratios. On the other hand, when the neutralization is carried out by means of an alkali bicarbonate, the use of two molecules of bicarbonate to one of the ester are employed to arrive at a similar result. The latter reaction is represented by the formula:

(4)

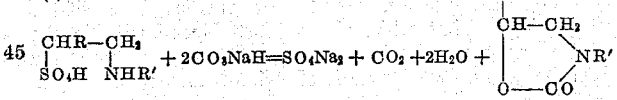

The manufacture of the oxazolidone 2 from the sulphuric acid esters of ethanolamine is easily made by heating one of that group with the alkali carbonate or alkali bicarbonate in the indicated proportions, in aqueous solution at variable temperatures on the order of 40–70° C. The heating should be carried out progressively so as to avoid all discharge of carbon dioxide except that which is normally produced in reaction 4. If the heating is carried out too violently, in particular with acid esters derived from amines, in which the formation of carbonate is relatively slow, a part of the bicarbonate is dissociated to produce neutral carbonate which is not able to react on the alkaline salt of the ester, contrary to reaction 1 hereinabove, as that reaction proceeds because of the presence of bicarbonate. A reduced yield accordingly results. In order to avoid that inconvenience, it is advisable, when the alkaline sulphuric ester is formed in situ by neutralization of the sulphuric acid ester by a neutral carbonate or a free alkali, to add a small quantity of bicarbonate to compensate for the loss of bicarbonate resulting from the course of reaction 3.

The length of time required for the completion of the reactions which form the oxazolidones according to the invention is variable depending upon the raw materials that are employed and, as the case may be, extend from about 12 to about 24 hrs.

The product of the reaction is composed of an aqueous liquid above a mass of crystals of alkaline sulphate that can be isolated by decantation and which can be washed with a saturated solution of alkaline sulphate. The filtrate and the wash water are united and evaporated under vacuum. The dry product obtained, which still contains some alkaline sulphate, is leached, preferably at elevated temperature, by solvents for the oxazolidones which do not dissolve the alkaline sulphates. Solvents of this kind are alcohol, benzene, dichloroethane and dichloroethylene.

As above pointed out there are different raw materials which produce different oxazolidones and the conditions which are best for each set of reactants vary somewhat, the greatest yield and highest purity being obtained when optimum conditions are employed for the particular product. Consequently, it is advantageous to depart as little as possible from the optimum conditions of temperature and length of the reaction so as to obtain oxazolidones as pure as possible in the raw state. When the operations are carried out without precautions, there may be formed greater or lesser quantities of ethanolamines and of ureas which have approximately the same solubility in solvents for oxazolidones, so that the final product in such cases may be viscous, non-crystallizable, and can be separated only with great difficulty. It is to be noted that dichlorethylene is especially interesting as a solvent when it is employed with an oxazolidone that is not substituted because the oxazolidone is very soluble at elevated temperature in dichlorethylene, while urea remains insoluble.

The raw oxazolidones obtained by evaporation of the solvent may be purified by crystallization or fractional distillation under high vacuum. The choice of the alkaline sulphuric ester of ethanolamine to be employed in the reaction is not wholly indifferent as the salts of potassium are superior to the other alkaline salts, being particularly soluble in water, which enables one to operate to more advantage in a more concentrated solution. The salts of ammonia can also be employed but in their case it is advantageous and economical to dissolve the sulphuric acid ester of ethanolamine in an ammoniacal solution and thereafter to saturate the solution with a current of carbon dioxide.

The following examples illustrate various phases of the invention. That which is set forth specifically in the following examples is not to be taken as a limitation on the generality of what is elsewhere stated:

*Example 1*

141 grs. (1 mol.) of the sulphuric acid ester of ethanolamine is dissolved in 200 cc. of water and 106 cc. of a solution of caustic soda of 37.8% concentration are added, while maintaining the temperature between 10 and 12° C. The limpid solution of the sodium salt of the sulphuric ester of ethanolamine, also called the sodium sulphate ester of ethanolamine, thus obtained is mixed with 90 grms. of sodium bicarbonate, then the whole mass is heated at 40° for eight hours and at 70° for ten to twelve hours thereafter. After having evaporated the mass to dryness, heated dichloroethane was used to dissolve the solid residue and out of this solution the oxazolidone was crystallized by cooling the solution. 79 grms. of oxazolidone, 90% yield was obtained.

*Example 2*

A mixture of 140 grms. of the sulphuric acid ester of ethanolamine and 350 grms. of an aqueous ammoniacal solution of 22° Bé. was raised to a temperature of 50° and a current of carbon dioxide was passed therethrough until the increase in weight was between 55 and 60 grms. The mass was thereafter maintained at 50° for 10 hours while continuing to introduce a lesser current of carbon dioxide. The heating was carried out at 60° for 4 hours then the temperature was raised to 70° for 4 hours. As in Example 1 the product was isolated, dissolved in dichloroethylene and the oxazolidone was crystallized out with a yield of 92%.

*Example 3*

In a flask provided with an agitator there was introduced at ordinary room temperature 141 grms. (1 mol.) of the sulphuric ester of monoethanolamine, 141 grms. (1 mol.) of potassium bicarbonate of 98% purity and 200 grms. of water. There was obtained a limpid solution that was carried slowly to 50° C. the rate of increase being slow enough to prevent the discharge into the air of carbon dioxide. The reaction mass was maintained at 50° C. for 4 hours. Thereafter a supplemental quantity of 14 grms. of potassium bicarbonate was added and the reaction was terminated by heating for about 12 hours more at 50° C. After cooling, the potassium sulphate crystallized out, it was separated by decantation and washed with a small quantity of a saturated solution of potassium sulphate. The filtrate and the wash solution were united and evaporated to dryness under vacuum. There was obtained a crystalline mass that was dissolved at elevated temperature by means of dichloroethane. By cooling the dichloroethane solution, there were recovered 83 grms. of oxazolidone melting at 92°. The yield was 94% of that which is theoretically possible.

*Example 4*

In a flask furnished with an agitator, as aforesaid, and with an escape tube, there was introduced 185 grms. of sodium bicarbonate, 250 grms. of water and 140 grms. of the sulfuric acid ester of ethanolamine. There was immediately produced a strong release of carbon dioxide which ended after an hour or two of contact. The mass was heated progressively to 50° about 15 hours being required to reach that temperature, then the temperature was raised to 70° for 45 hours. The preparation was ended in the manner of Example 1 or Example 3, but using alcohol as a solvent for the oxazolidone. The oxazolidone was obtained in a yield of 90%.

*Example 5*

In a mixture of 113 grms. of sodium carbonate and 250 cc. of water there was admixed at ordinary temperature 141 grms. of the sulphuric acid ester of ethanolamine. This was allowed to rest for 3 to 4 hours at room temperature, then an additional quantity of 15 grms. of sodium bicarbonate was added and the mass was heated at 40° for about 10 hours then it was heated at 70° for 6 to 7 hours. After cooling, the preparation was ended as in Example 1 by decanting the alkaline sulphate, evaporating under vacuum the aqueous solution, and redissolving the solid precipitate in a solvent. The oxazolidone was produced in a yield of 90%.

*Example 6*

150 grms. of sodium carbonate was dissolved in 200 grms. of water and raised to 50° C. Into this solution there was gradually admixed, the addition taking about 3 hours, with agitation, a solution of 155 grms. (1 mol.) of the sulphuric acid ester of methyl ethanolamine which had been dissolved in 150 grms. of water. When the introduction had been completed, the mass was still maintained at 50° for 15 to 20 hours, and there was obtained a liquid holding in suspension crystals which were isolated by filtration. The filtered liquid was evaporated under vacuum. The crystals which had been deposited and isolated were washed with alcohol and the alcoholic liquid was combined with the residue from the vacuum evaporation of the aqueous liquid. This mixture was again evaporated to dryness and the deposit was dissolved in alcohol, which dissolved the methyloxazolidone and isolated a new quantity of sodium salt.

Example 7

Into 185 grms. (1 mol.) of the sulphuric acid monoester of diethanolamine of the formula

there were slowly introduced 255 grms. of an ammoniacal aqueous solution (22° Bé.) which contained the equivalent of 3 moles. of ammonia. In this solution 72 grms. of $CO_2$ gas were passed. The mass was thereafter heated to 40° and kept at that temperature 15 to 18 hrs. After cooling, the ammonium sulphate formed was isolated by filtration and washed with alcohol. The filtrate and the wash waters were united and evaporated to dryness and there were recovered 136 grms. of N-ethanoloxazolidone under the form of a slightly brownish viscous liquid still containing some small quantities of sulphate. This raw product was employed as it was for subsequent reactions. It could not be conveniently purified by distillation because it had a tendency to decompose and to become resinous. In employing small quantities, so as to avoid too long an application of heat, one can obtain a purer product by boiling at 170° under .5 mm. of mercury pressure, but this produces a lower yield, approximating 60%.

Example 8

108.5 grms. (½ mol.) of the sulphuric ester of phenyl ethanolamine was dissolved in 200 cc. of water and was transformed to sodium salt by the progressive addition at zero degrees centigrade of a quantity of sodium hydroxide of 36° Bé. concentration, which had been diluted with its own weight of water and which contained 20 grms. of soda. Into the solution thus prepared, there were admixed 50 grms. of sodium carbonate. The mixture was heated at 45° C. for 2 to 3 hrs. then at 60° for 20 hrs., and a precipitated formed which was isolated by filtration. The liquid was evaporated to dryness and the residue was dissolved in alcohol. By evaporation of the alcohol there were obtained 70 grs. of phenyloxazolidone in a crystalline form, slightly colored green, melting at 117°. By recrystallization and decoloration with animal charcoal 65 grs. of white crystals were obtained melting at 123°.

Among the uses for the products of this process are the following:

These products are useful as intermediates in chemical synthesis and in particular they constitute starting materials for the manufacture of polyfunctional compounds which in turn may be transformed to plastics by polymerization or condensation.

Ammonium carbonate can be used in place of the alkali carbonates.

The degree of vacuum to be employed in most cases can be judged by simple observation, but is ordinarily on the order of 1 to 10 m./m. Hg.

The invention includes the following features:

1. A process of making oxazolidones 2 which involves reacting an alkali bicarbonate with the alkali salts of sulphuric acid esters of ethanolamines.

2. The process according to 1 in which the alkaline salt of the ethanolamine ester is formed in situ at the moment of its employment by the neutralization of the sulphuric acid ester of the ethanolamine chosen, by means of a free alkali or of an alkali carbonate, the latter term including bicarbonates.

3. The process according to 1 or 2 in which the raw materials, under the form of an aqueous solution are slowly heated at temperatures on the order of 40–70° and are maintained at these temperatures for 12–24 hrs.

4. The process in any one of 1, 2 and 3 in which the separation of the oxazolidone and the by-products of the reaction is effectuated by decantation of the aqueous liquid to eliminate the crystals of alkali sulphate, by evaporation to dryness of the aqueous liquid, and dissolving of the residue by a solvent for the oxazolidone, from which the oxazolidone can be extracted in a pure state by crystallization or by distillation under vacuum.

5. A process according to 2 in which the operation is carried out in the presence of a slight excess of alkali bicarbonate with respect to the theoretical quantity.

6. That method of employing the process described in the foregoing numbered paragraphs in which there is employed ammonium bicarbonate, which is formed in situ in the reaction mass by the successive addition of an aqueous ammoniacal solution and carbon dioxide gas.

As many apparently widely different embodiments of the present invention may be made without departing from the spirit and scope thereof, it is to be understood that the invention is not limited to the specific embodiments.

What is claimed is:

1. The method of making an oxazolidone-2 that comprises admixing an alkalibicarbonate with an alkaline sulfate ester of an ethanolamine in an inert liquid reaction medium, heating the mass at about 40° C., thereby forming an alkaline salt, thereafter heating the mass at about 70° C., thereby cyclizing the said salt and forming oxazolidone 2, and isolating the oxazolidone 2.

2. The method of making an oxazolidone-2 that comprises admixing about 2 moles of alkali acid carbonate with about 1 mole of sulfuric acid ester of an ethanolamine in inert liquid reaction medium, heating the mass to about 40° C., thereby forming an alkaline salt, heating the mass to about 70° C., thereby cyclizing the said salt and forming oxazolidone 2, and isolating the oxazolidone 2.

3. The method of making an oxazolidone-2 that comprises admixing about 1 mole of alkalibicarbonate and about 1 mole of alkaline sulfate ester of an ethanol amine in liquid inert medium, heating the mass to about 40° C., thereby forming an alkaline salt of a substituted carbonic acid, heating the mass to about 70° C., thereby forming oxazolidone 2 by cyclizing the said salt, and isolating the oxazolidone 2.

4. The method of making an oxazolidone-2 that comprises admixing in aqueous medium an alkalibicarbonate and an alkaline sulfate ester of an ethanolamine, heating the mass to the range 40–70° C., and isolating the oxazolidone 2.

5. The method of claim 4 in which the esters are potassium sulfate esters.

6. The method of claim 4 in which the esters are ammonium sulfate esters.

7. The method of making an oxazolidone-2 that comprises admixing about 1 mole of alkali carbonate and about 1 mole of sulfuric acid ester of an ethanol amine in liquid inert medium, heating the mass to about 40° C., thereby forming an alkaline salt, heating the mass to about 70° C., thereby cyclizing said salt and forming oxazolidone 2, and isolating the oxazolidone 2 .

8. The method of claim 4 in which the alkaline sulfate ester is made in situ by the reaction of the sulfuric acid ester of ethanolamine with alkali hydroxide and a compound selected from the class consisting of alkali neutral carbonate and alkali acid carbonate.

9. The method of making oxazolidones-2 which comprises fixing an alkali bicarbonate on the amino group of an alkali sulphate ester of ethanolamine, and removing alkali sulfate from said salt and cyclizing the remainder thereof, the first part of said reactions being carried out at a temperature not over 40–50° C. and the said removal and cyclizing being carried out at a temperature in the range about 40–70° C.

10. The method of making oxazolidones-2 which comprises fixing an alkali bicarbonate on the amino group of an alkali sulphate ester of ethanolamine, and removing alkali sulfate from said salt and cyclizing the remainder thereof.

11. The method of making oxazolidone-2 that comprises admixing the sulphuric acid ester of ethanolamine with aqueous ammonia, admitting $CO_2$ thereto, heating at circa 40° C. to 70° C., and isolating the oxazolidone 2.

12. The method of making oxazolidone-2 that comprises reacting the sulphuric acid mono-ester of diethanolamine with aqueous ammonia, admitting $CO_2$ thereto and heating circa 40° C. to 70° C.

13. The method of making oxazolidone-2 that comprises reacting the sulphuric acid ester of an ethanolamine with ammonia and carbon dioxide.

14. The method of making oxazolidones-2 that comprises reacting a carbonate of the group consisting of the alkali metals and ammonia with a sulphate ester of an ethanol amine from the group consisting of the alkali metals and ammonia.

15. The method of making oxazolidones-2 that comprises in a first step fixing an alkaline bicarbonate on the amino group of the alkaline sulphate ester of ethanolamine, thus forming an alkaline salt of a substituted carbamic acid, and in a second step eliminating a molecule of alkali sulphate from each molecule and cyclizing the remainder of the molecule.

16. The method of claim 4 in which the alkaline sulfate ester and the ammonium bicarbonate are made in situ by the reaction of ammonia, carbon dioxide, and the sulphuric acid ester of ethanolamine in aqueous solution, the oxazolidone-2 being produced by heating the mass to the range 40–70° C.

References Cited in the file of this patent

UNITED STATES PATENTS 2,399,118     Homeyer _____ Apr. 23, 1946

FOREIGN PATENTS 913,163     France _____ May 20, 1946

OTHER REFERENCES

Gabriel: Ber. Deut. Chem., vol. 21, p. 568 (1888).
Gabriel et al.: Ber. Deut. Chem., vol. 30, p. 2494 (1897).
Gabriel: Ber. Deut. Chem., vol. 38, p. 2410 (1905).
Pierce: J. Am. Chem. Soc., vol. 50, pp. 241–4 (1928).
Katchalski et al.: Chem. Abst., vol. 45, col. 2933 (1951).
McKay et al.: Chem. Abst., vol. 46, cols. 9559–60 (1952).
Houben: "Die Methoden der Org. Chem." (Edwards), vol. 2, pp. 645–46 and 657–62 (1943).